E. C. GEORGE.
LUBRICATING DEVICE.
APPLICATION FILED JUNE 1, 1914.
1,149,125.
Patented Aug. 3, 1915.
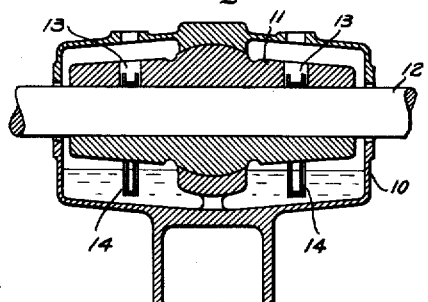
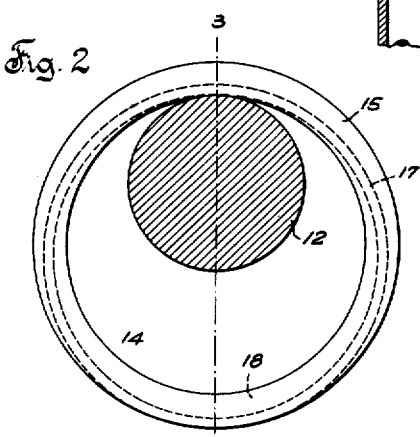
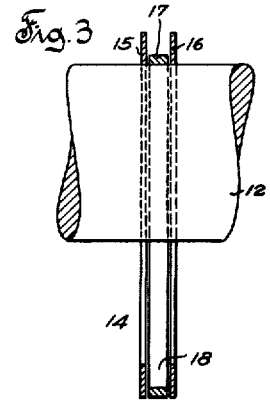
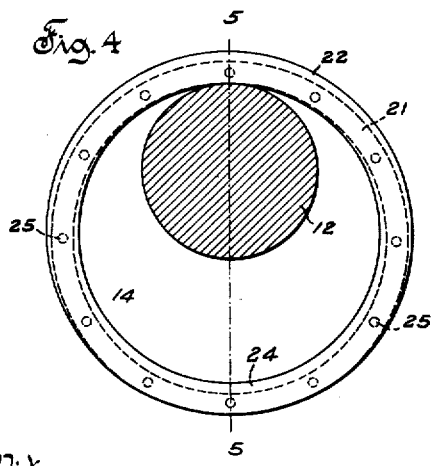
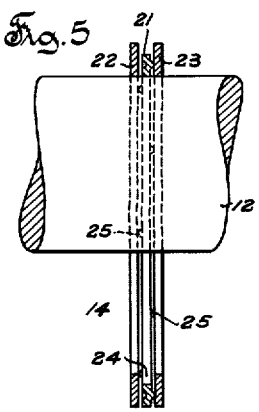
Witnesses
Rob. E. Stoll.
E. C. George, Inventor
By
Attorneys

UNITED STATES PATENT OFFICE.

EDGAR C. GEORGE, OF NORWOOD, OHIO, ASSIGNOR TO ALLIS-CHALMERS MANUFACTURING COMPANY, OF MILWAUKEE, WISCONSIN, A CORPORATION OF DELAWARE.

LUBRICATING DEVICE.

1,149,125.  Specification of Letters Patent.  Patented Aug. 3, 1915.

Application filed June 1, 1914. Serial No. 842,790.

*To all whom it may concern:*

Be it known that I, EDGAR C. GEORGE, a citizen of the United States, residing at Norwood, in the county of Hamilton and State of Ohio, have invented a certain new and useful Improvement in Lubricating Devices, of which the following is a specification.

This invention relates in general to the lubrication of bearings of the self-oiling type, and is of particular utility in connection with the lubrication of bearings of this character for horizontally disposed shafts.

Prior to this invention, there have been in use lubricating devices comprising a plurality of contiguously positioned and unconnected rings of the same internal diameter and other like physical characteristics. The rings of such a lubricating device, being of the same internal diameter and other like physical characteristics, tend to rotate at approximately the same speed. Any tendency to deviate from this single speed is opposed by the capillary attraction of oil particles between the sides of adjacent rings, and the surface tension of particles or bodies of oil that are in contact with a plurality of the rings, the effective result being that the rings rotate as a single body, and, consequently, the speed of the lubricating device is approximately proportional to the speed of the rotating shaft. Such a lubricating device is quite efficient when the shaft is operating at a comparatively high speed, as its movement through the body of oil in the lower portion of the bearing housing causes splashing and slinging of the oil against the sides of the housing; and it may happen that this action of the rings, in splashing the oil from the well at the lower part of the bearing housing, may so diminish the body of oil that the inner periphery of the rings may not fully dip into the oil, diminishing the supply of oil carried to the upper portion of the shaft to such an extent as to produce insufficient lubrication of the bearing.

It is an object of this invention to provide an improved device for lubricating bearings of the self-oiling type, which device is comparatively simple in construction and efficient in operation.

It is a further object of this invention to provide an improved lubricating device utilizing a plurality of unconnected ring elements of different physical characteristics.

It is a further object of this invention to provide a lubricating device comprising a plurality of ring elements of different internal diameters and so arranged as to form an oil carrying pocket.

These and other objects are attained by this invention, the novel features of which will appear from the description and drawings, disclosing one embodiment of such invention, and will be particularly pointed out in the claims.

In the accompanying drawings: Figure 1 is a vertical section of a bearing for a horizontally disposed shaft, and a housing for such bearing, the lubricating means for the bearing embodying the principles of this invention. Fig. 2 is a side view of a lubricating device embodying this invention, and in place on a shaft. Fig. 3 is a section on the line 3—3 of Fig. 2. Fig. 4 is a view similar to Fig. 2, showing a modification of the device shown in Figs. 2 and 3. Fig. 5 is a section on line 5—5 of Fig. 4.

As shown in the drawings, a bearing housing 10 supports a bearing 11 for the shaft 12, both the bearing housing and the bearing, as in the ordinary construction, being in two parts, longitudinally divided in the plane of the axis of the shaft. A plurality of grooves 13 extend through the upper portion of the bearing 11, and each of these grooves receives a lubricating device 14.

This lubricating device 14 comprises a plurality of separate rings 15, 16, and 17, the rings 15 and 16 being of substantially the same size, and preferably stamped from comparatively thin sheet metal. The ring 17 is, preferably, of somewhat heavier construction, and may be of cast metal, as is usual in the ordinary type of single ring, oiling element. The inner diameter of the ring 17 is greater than the inner diameter of the rings 15 and 16 and is preferably less than the outer diameter of the latter rings. With such an arrangement, it will be obvious that, when the rings are in place on a shaft, a pocket 18 is formed between the two side rings 15 and 16 and the intermediate ring 17.

In the operation of this device, a considerable body of oil remains in the pocket 18 and is carried to the upper side of the shaft clinging to the rings, as it were, due to the action of surface tension and capillary attraction, the oil being squeezed out from between the rings as it reaches the upper side of the shaft, by the inner ring 17, as its inner periphery more nearly approaches the inner periphery of the outside rings 15, 16. An abundant supply of oil is furnished to the shaft and bearing in this manner.

In operation, there is a tendency of the ring 17 to remain fixed in position relatively to the rings 15 and 16, this effect being due to the action of capillary attraction of the oil between the inner sides of the rings 15 and 16 and the sides of the ring 17, and to the action of surface tension of particles of oil that lie in contact with two or more of these rings, especially those oil particles that are in the pocket 18. The inner ring being of greater diameter than the outer rings, this tendency of the rings to remain in fixed relation as they rotate, causes such displacement of the inner ring as carries its center of gravity outside of the vertical line extending through the center of the shaft. As the force due to this unbalancing becomes sufficient, gravity acts to cause a slipping back of the rings, and, in case the force is sufficient to overcome the action of capillary attraction and surface tension, tending to hold the rings in contact, there is a slipping back of the inner ring relatively to the outer rings, as in an anti-clockwise direction, if the shaft and rings are rotating in a clockwise direction. But even though the holding effect of the oil is broken to such an extent as to permit the inner ring to slip relatively to the outer rings, the fact that the outer rings are, in the ordinary construction, considerably lighter than the inner ring and that there may be some holding due to the surface tension of the oil in the pocket 18, results in the outer rings being carried back or temporarily held, to some extent, by the inner ring. It will be seen that all the actions resulting contribute to cause a backward movement of the oil rings relatively to the shaft, retarding the rings to the extent that the speed of the same will be considerably less than that of the shaft. Further, in the operation of the device, there is a body of oil in the pocket 18, formed between the three rings, and the action of the device is to cause this body of oil to build up, in case the shaft is rotating in a clockwise direction, on the rear side of the shaft. The centrifugal force due to the angular movement of this mass of oil is exerted in such a direction as to exercise a moment tending to rotate, at least the inner ring, backward relatively to the shaft. Due to the action of capillary attraction and surface tension of the oil, this tendency toward backward rotation of the inner ring is communicated, at least to some extent, to the outer rings, the whole effect being to retard the rotation of the ring elements, the inner ring, on which centrifugal force acts directly, being retarded probably to a greater extent than the outer rings. It will be obvious that the retardation of the rings relatively to the shaft, due to centrifugal force, is a function that varies in the same sense as the speed of the rotation of the shaft. In the case of high speed shafts, it will be obvious that this action due to centrifugal force is a decidedly beneficial one, since it limits the speed of the ring, and, hence, prevents the attaining of such a speed as will cause splashing and slinging of the oil within the bearing housing. Another effect of that portion of the oil that is lifted from the level of the oil in the well, by the pocket 18, is its action, as a force due to gravity, in a direction to cause retardation of the rings, the greater effect being exerted on the inner ring. This force varies in the same sense as the speed of the shaft, for a body of oil will be piled up to a greater extent when the shaft is rotating at a higher speed; and, further, the center of gravity of this displaced body of oil will be at a point where a greater moment is exerted about the point of tangency of the shaft and ring, when the speed is higher.

A feature that adds greatly to the utility of the device is that the farther the center of gravity of the inner ring is carried back of the center line of the shaft in the operation of the device, the farther the point of contact between this ring and the shaft is carried to the opposite side of the center line, this action resulting in the extension of the oil-carrying pocket between the rings to a point beyond the center line of the shaft. This extended oil-carrying pocket conveys a large body of oil to a point directly over the top of the shaft; and, as the displacement of the inner ring varies in the same sense as the speed, the amount of oil carried to the upper portion of the shaft will always suffice for efficient lubrication independently of the speed of the shaft, and, in fact, the bearing may be better lubricated when the shaft is operating at the higher speeds.

By varying any one of several elements, the amount of oil carried to the shaft, and the action of the device, as the speed varies, may be changed within considerable limits. For instance, varying the weight of the ring 17 would act to vary the retarding effect due to the weight of this ring, or, in a similar manner, making any equivalent provision, such as varying any force or forces acting to retard or assist movement of one ring relatively to another, would also act to vary the lubricating effect; and varying the difference of the internal diameters of the rings, so as to change the size of the pocket 18, would change the amount of oil carried in this pocket, and, in this way, change the retarding effect due to the centrifugal force of the body of oil piled up at the rear side of the shaft, and also the effect of this body of oil due to gravity.

In Figs. 4 and 5, is shown a modification of the lubricating device of Figs. 2 and 3. An inner ring 21, of comparatively light and thin material is shown as being held in spaced relation to the outer rings 22 and 23, as by means of integral projections 25 on opposite sides of the inner ring, the latter being of greater diameter than the outer rings to form a pocket 24. The presence of such spaces as exist in this form of lubricating device, between the inner ring and the two outer rings, decreases the oil carrying capacity of the device to some extent; and, further, the appreciable spacing between the inner ring and the two outer rings decreases, to some extent, the action of capillary attraction and surface tension in holding the rings against relative movement.

It will be obvious that the weight of the inner ring may be anything desirable relative to the outer rings, and that the difference between the diameters of the inner and outer eccentrically disposed rings may be anything desirable, depending on the degree of lubrication desired. It will also be apparent that a number of ring elements in excess of three may be used, provided certain physical characteristics of one set of rings are different from those of another set. In fact, in accordance with a broad principle of this invention, a plurality of separate rings may be used provided only that the rings are of such different physical characteristics or are subjected to such different forces as cause one ring to tend to move at a different speed from another, when the rings are disposed in proper cooperative relation on the rotatable member to be lubricated.

It should be understood that it is not desired to be limited to the exact details of construction shown and described, for obvious modifications will occur to a person skilled in the art.

It is claimed and desired to secure by Letters Patent:

1. In combination, a shaft, a bearing therefor, a reservoir for lubricant, and a plurality of lubricating elements of ring shape cooperating with and lying immediately adjacent each other axially of the shaft, said elements being of different inner diameters and adapted at their lower portions to be immersed in the lubricant in said reservoir.

2. In combination, a shaft, a bearing therefor, a reservoir for lubricant, and a plurality of ring-shaped elements laterally adjacent each other and carried by said shaft, said elements being capable of independent rotation on said shaft and an intermediate one of said elements being of greater inner diameter than the adjacent elements, and each of said elements being adapted at its lower portion to pass through the lubricant in said reservoir.

3. In combination, a shaft, a bearing therefor, a reservoir for lubricant, and a plurality of lubricating elements coöperating with each other and lying immediately continuous to each other, said elements being capable of being independently actuated by said shaft and adapted at their lower portions to pass through the lubricant in said reservoir, and a portion of an intermediate one of said elements below said shaft being farther from the shaft than adjacent elements whereby an oil-carrying pocket is formed by said elements below said shaft.

4. A lubricating device for shafts, comprising a plurality of unconnected ring elements at least three in number and adapted to surround a shaft and lie in contact therewith and be rotated thereby, one of said ring elements being of greater internal diameter than another.

5. In combination with a shaft, a lubricating device comprising three independently movable ring-shaped elements disposed on said shaft and contiguously related, the intermediate one of said elements being of greater internal diameter than those immediately adjacent thereto.

6. In combination with a shaft, a lubricating device therefor, comprising a plurality of ring elements lying immediately adjacent each other in an axial direction on said shaft, one of said elements being heavier than another.

7. A lubricating device for shafts, comprising a plurality of ring elements, the internal diameter of one of said elements being greater than the internal diameter and less than the external diameter of another of said elements.

8. In combination with a rotatable member, a lubricating device for said rotatable member comprising a plurality of relatively contiguously and eccentrically related, ring elements mounted directly on said rotatable member for rotation thereby.

9. In combination with a shaft, a lubricating device for said shaft comprising a plurality of ring elements mounted on said shaft adjacent each other in an axial direction for rotation by said shaft, an intermediate one of said elements being eccentrically disposed relatively to other of said elements.

10. In combination with a rotatable member, a lubricating device therefor, comprising a plurality of independent, eccentrically related, annular elements lying adjacent each other in an axial direction along said rotatable member and actuable thereby, said annular elements being adapted to coöperate in conveying lubricating material when actuated by said rotatable member.

11. In combination with a shaft, a lubricating device therefor, comprising a plurality of individual, coöperative ring elements lying immediately adjacent each other in an axial direction on said shaft and rotatable thereby, the forces opposing rotation of the several ring elements being different at any instant.

12. In combination with a shaft, a lubricating device therefor, comprising a plurality of coöperative ring elements encircling said shaft and lying adjacent each other thereon, said ring elements being of different physical characteristics and being independently actuatable by said shaft.

13. In a lubricating device for shafts, a plurality of coöperative lubricant conveying elements at least three in number and adapted to lie adjacent each other on the shaft, said elements being of ring shape and one of said elements being of different physical characteristics from another whereby the rotative effects produced by said shaft on the individual elements are different at any instant.

14. In combination with a shaft, a lubricating device therefor, comprising a plurality of individual, coöperative ring elements encircling said shaft and rotatable thereby, said ring elements being of different physical characteristics whereby there exists a tendency for said individual elements to rotate at different speeds at any instant when said shaft is in operation.

15. In combination with a shaft, a lubricating device therefor, comprising a plurality of coöperative ring elements lying immediately adjacent each other in an axial direction on said shaft and rotatable thereby, one of said elements being of different physical characteristics from another whereby the rotative effects exercised by said shaft on said rings are different.

16. In combination with a shaft, a lubricating device therefor, comprising a plurality of coöperative ring elements lying immediately adjacent each other in an axial direction on said shaft and rotatable thereby, one of said ring elements having a tendency to rotate at a speed different from that of another at any instant during the rotation of said shaft.

17. In combination with a shaft, a lubricating device therefor, comprising a plurality of individual coöperative ring elements lying adjacent each other on said shaft in a direction parallel to the axis thereof, one of said ring elements being of different inner diameter from another.

18. In combination with a shaft, a lubricating device therefor, comprising a plurality of individual coöperative ring elements encircling said shaft and lying adjacent each other thereon in a direction parallel to the axis of the shaft, said ring elements being of different physical characteristics.

In testimony whereof, the signature of the inventor is affixed hereto in the presence of two witnesses.

EDGAR C. GEORGE.

Witnesses:
W. C. EVERHARDT,
HARVEY E. ANTRIM.

It is hereby certified that in Letters Patent No. 1,149,125, granted August 3, 1915, upon the application of Edgar C. George, of Norwood, Ohio, for an improvement in "Lubricating Devices," an error appears in the printed specification requiring correction as follows: Page 1, line 33, for the word "efficient" read *inefficient;* and that the said Letters Patent should be read with this correction therein that the same may conform to the record of the case in the Patent Office.

Signed and sealed this 7th day of September, A. D., 1915.

[SEAL.]

J. T. NEWTON,
*Acting Commissioner of Patents.*